United States Patent
Hatada

(10) Patent No.: US 8,927,166 B2
(45) Date of Patent: Jan. 6, 2015

(54) INDIRECT INTERNAL REFORMING SOLID OXIDE FUEL CELL AND METHOD FOR SHUTTING DOWN THE SAME

(75) Inventor: Susumu Hatada, Kanagawa (JP)

(73) Assignee: JX Nippon Oil & Energy Corporation (JP)

( * ) Notice: Subject to any disclaimer, the term of this patent is extended or adjusted under 35 U.S.C. 154(b) by 995 days.

(21) Appl. No.: 12/864,963

(22) PCT Filed: Jan. 14, 2009

(86) PCT No.: PCT/JP2009/050351
§ 371 (c)(1),
(2), (4) Date: Nov. 15, 2010

(87) PCT Pub. No.: WO2009/096221
PCT Pub. Date: Aug. 6, 2009

(65) Prior Publication Data
US 2011/0189566 A1    Aug. 4, 2011

(30) Foreign Application Priority Data
Jan. 28, 2008   (JP) .................................. 2008-016346

(51) Int. Cl.
*H01M 8/04* (2006.01)
*H01M 8/12* (2006.01)
*C01B 3/38* (2006.01)
*H01M 8/06* (2006.01)

(52) U.S. Cl.
CPC ...... *H01M 8/04089* (2013.01); *H01M 8/04955* (2013.01); *Y02E 60/525* (2013.01);
(Continued)

(58) Field of Classification Search
USPC ......................................................... 429/429
See application file for complete search history.

(56) References Cited
U.S. PATENT DOCUMENTS
2002/0025458 A1* 2/2002 Faville et al. ................... 429/13

2002/0046889 A1* 4/2002 Kunitake et al. ............. 180/65.3
2008/0102332 A1* 5/2008 Choi et al. ...................... 429/23

FOREIGN PATENT DOCUMENTS
EP    1227532 A2    7/2002
EP    1852930 A1    11/2007
(Continued)

OTHER PUBLICATIONS
International Search Report for International Application No. PCT/JP2009/050351 mailed May 12, 2009 with English translation.
(Continued)

*Primary Examiner* — Ula C. Ruddock
*Assistant Examiner* — Jacob Marks
(74) *Attorney, Agent, or Firm* — Cantor Colburn LLP

(57) ABSTRACT

Provided is a method for shutting down an indirect internal reforming SOFC, in which a hydrocarbon-based fuel is reliably reformed, and the oxidative degradation of the anode can be prevented by a reformed gas. A method for shutting down an indirect internal reforming SOFC including a reformer; an SOFC; a combustion region for combusting the anode off-gas of the SOFC; and an enclosure for housing the reformer, the SOFC, and the combustion region, wherein the method includes causing the flow rate of a fuel supplied to the reformer to become FE from FS; and stopping the supply of the fuel to the reformer when an anode temperature becomes lower than the oxidative degradation temperature, where FE represents a flow rate of the fuel supplied to the reformer in a state in which the anode temperature is steady and lower than the oxidative degradation temperature, in which in the reformer the fuel is reformed and a reformed gas with a composition suitable to be supplied to an anode is produced, and in which an amount of the reformed gas produced is equal to or more than the requisite minimum flow rate for preventing the oxidative degradation of the anode when the anode temperature is a temperature equal to or higher than the oxidative degradation temperature, and FS represents a flow rate of the fuel supplied to the reformer at the start of the shutdown method. Also provided is an indirect internal reforming SOFC appropriate for this method.

7 Claims, 3 Drawing Sheets

(52) U.S. Cl.
CPC ............... *H01M 8/12* (2013.01); *C01B 3/386* (2013.01); *C01B 2203/107* (2013.01); *H01M 8/04776* (2013.01); *H01M 8/04388* (2013.01); *H01M 8/0432* (2013.01); *C01B 2203/1064* (2013.01); *C01B 2203/1058* (2013.01); *C01B 2203/0233* (2013.01); *H01M 8/04328* (2013.01); *C01B 2203/0244* (2013.01); *C01B 2203/1609* (2013.01); *C01B 2203/066* (2013.01); *H01M 2008/1293* (2013.01); *C01B 3/38* (2013.01); *C01B 2203/0261* (2013.01); *Y02E 60/521* (2013.01); *H01M 8/04425* (2013.01); *H01M 8/04223* (2013.01); *C01B 3/382* (2013.01); *H01M 8/0618* (2013.01)
USPC .......................................... 429/429; 429/428

(56) References Cited

FOREIGN PATENT DOCUMENTS

| | | | |
|---|---|---|---|
| JP | 6-13095 | A | 1/1994 |
| JP | 11-162492 | A | 6/1999 |
| JP | 2003-229164 | A | 8/2003 |
| JP | 2004-319420 | A | 11/2004 |
| JP | 2005-293951 | A | 10/2005 |
| JP | 2005-340075 | A | 12/2005 |
| JP | 2006-294508 | A | 10/2006 |
| JP | 2007-128717 | A | 5/2007 |
| JP | 2007-273311 | A | 10/2007 |
| WO | 2006090685 | A1 | 8/2006 |

OTHER PUBLICATIONS

Extended European Search Report for Application No. 09705122.1-2219 dated Dec. 4, 2012.

Submission of Prior Art Publication from Japanese Patent Office, for Japanese Patent Application No. 2008-16346, dated Apr. 20, 2012, with English translation.

* cited by examiner

INDIRECT INTERNAL REFORMING SOLID OXIDE FUEL CELL AND METHOD FOR SHUTTING DOWN THE SAME

This is a U.S. national stage application of International Application No. PCT/JP2009/050351, filed on 14 Jan. 2009. Priority under 35 U.S.C. §119(a) and 35 U.S.C. §365(b) is claimed from Japanese Application No. 2008-016346, filed 28 Jan. 2008, the disclosure of which is also incorporated herein by reference.

TECHNICAL FIELD

The present invention relates to an indirect internal reforming solid oxide fuel cell including a reformer in the vicinity of a fuel cell.

BACKGROUND ART

A solid oxide fuel cell (hereinafter sometimes referred to as SOFC) system usually includes a reformer for reforming a hydrocarbon-based fuel, such as kerosene and city gas, to generate a reformed gas as a hydrogen-containing gas, and an SOFC for electrochemically reacting the reformed gas and air for electric power generation.

The SOFC is usually operated at a high temperature of 550 to 1000° C.

Various reactions, such as steam reforming (SR), partial oxidation reforming (PDX), and autothermal reforming (ATR), are used for reforming, and heating to a temperature at which catalytic activity is exhibited is necessary for using a reforming catalyst.

Steam reforming is a very large endothermic reaction. Also, the reaction temperature of the steam reforming is 550 to 750° C., which is relatively high, and the steam reforming requires a high temperature heat source. Therefore, an indirect internal reforming SOFC is known in which a reformer (internal reformer) is installed near an SOFC, and the reformer is heated using radiant heat from the SOFC and the combustion heat of the anode off-gas (gas discharged from the anode) of the SOFC as heat sources (Patent Document 1).

Also, Patent Document 2 discloses a method for shutting down the operation of a fuel cell, in which the stack temperature is decreased, while the fuel electrode layer side is maintained in a reducing state, by supplying water and hydrogen or a hydrocarbon-based fuel to the fuel cell, while decreasing their flow rate, in stopping electric power generation.
Patent Document 1: JP2004-319420A
Patent Document 2: JP2006-294508A

DISCLOSURE OF THE INVENTION

Problems to be Solved by the Invention

It is considered that when the method described in Patent Document 2 is used, the anode can be maintained in a reducing atmosphere during the shutdown of the fuel cell, and the oxidative degradation of the anode can be prevented.

However, in the method described in Patent Document 2, reliable reforming is not ensured when the SOFC anode is maintained in a reducing state using a hydrogen-containing gas obtained by reforming a hydrocarbon-based fuel. In other words, unreformed hydrocarbon-based fuel may be discharged from the reformer and flow into the anode.

Particularly, in a case where a heavy hydrocarbon, such as kerosene, is used, when the heavy hydrocarbon leaks from the reformer and flows into the SOFC, the performance of the SOFC may be degraded due to carbon deposition.

It is an object of the present invention to provide a method for shutting down an indirect internal reforming SOFC, in which it is possible to reliably reform a hydrocarbon-based fuel and prevent the oxidative degradation of the anode by the reformed gas.

It is another object of the present invention to provide an indirect internal reforming SOFC preferred for performing such a shutdown method.

Means for Solving the Problems

The present invention provides a method for shutting down an indirect internal reforming solid oxide fuel cell including:
a reformer having a reforming catalyst layer, for reforming a hydrocarbon-based fuel to produce a reformed gas;
a solid oxide fuel cell for generating electric power using the reformed gas;
a combustion region for combusting an anode off-gas discharged from the solid oxide fuel cell; and
an enclosure for housing the reformer, the solid oxide fuel cell and the combustion region,
wherein the method includes:
a) causing a flow rate of the hydrocarbon-based fuel supplied to the reformer to become FE from FS; and
b) stopping supply of the hydrocarbon-based fuel to the reformer when an anode temperature becomes lower than an oxidative degradation temperature,
where FE represents a flow rate of the hydrocarbon-based fuel supplied to the reformer in a state in which the following conditions i to iv are all satisfied,
i) the anode temperature of the solid oxide fuel cell is steady,
ii) the anode temperature is lower than the oxidative degradation temperature,
iii) in the reformer, the hydrocarbon-based fuel is reformed, and a reformed gas with a composition suitable to be supplied to an anode is produced, and
iv) an amount of the reformed gas produced is equal to or more than the requisite minimum flow rate for preventing oxidative degradation of the anode when the anode temperature of the solid oxide fuel cell is a temperature equal to or higher than the oxidative degradation temperature, and
FS represents a flow rate of the hydrocarbon-based fuel supplied to the reformer at a point of time of start of the shutdown method.

The present invention is particularly effective when the hydrocarbon-based fuel includes a hydrocarbon-based fuel(s) with a carbon number of two or more.

In this case, a concentration of a compound(s) with a carbon number of two or more in the reformed gas is preferably 50 ppb or less on a mass basis.

Also, the present invention provides an indirect internal reforming solid oxide fuel cell including:
a reformer having a reforming catalyst layer, for reforming a hydrocarbon-based fuel to produce a reformed gas;
a solid oxide fuel cell for generating electric power using the reformed gas;
a combustion region for combusting an anode off-gas discharged from the solid oxide fuel cell; and
an enclosure for housing the reformer, the solid oxide fuel cell, and the combustion region,
wherein the indirect internal reforming solid oxide fuel cell further includes:
I) means for causing a flow rate of the hydrocarbon-based fuel supplied to the reformer to become FE from FS; and II) means for stopping supply of the hydrocarbon-based fuel to the reformer when an anode temperature becomes lower than an oxidative degradation temperature, where FE represents a flow rate of the hydrocarbon-based fuel supplied to the reformer in a state in which the following conditions i to iv are all satisfied, i) the anode temperature of the solid oxide fuel cell is steady, ii) the anode temperature is lower than the oxidative degradation temperature, iii) in the reformer, the hydrocarbon-based fuel is reformed, and a reformed gas with a composition suitable to be supplied to an anode is produced, and iv) an amount of the reformed gas produced is equal to or more than the requisite minimum flow rate for preventing oxidative degradation of the anode when the anode temperature of the solid oxide fuel cell is a temperature equal to or higher than the oxidative degradation temperature, and FS represents a flow rate of the hydrocarbon-based fuel supplied to the reformer at a point of time of start of the shutdown method.

Advantages of the Invention

The present invention provides a method for shutting down an indirect internal reforming SOFC, in which it is possible to reliably reform a hydrocarbon-based fuel and prevent the oxidative degradation of the anode by the reformed gas.

Also, the present invention provides an indirect internal reforming SOFC preferred for performing such a shutdown method.

Figure 1:
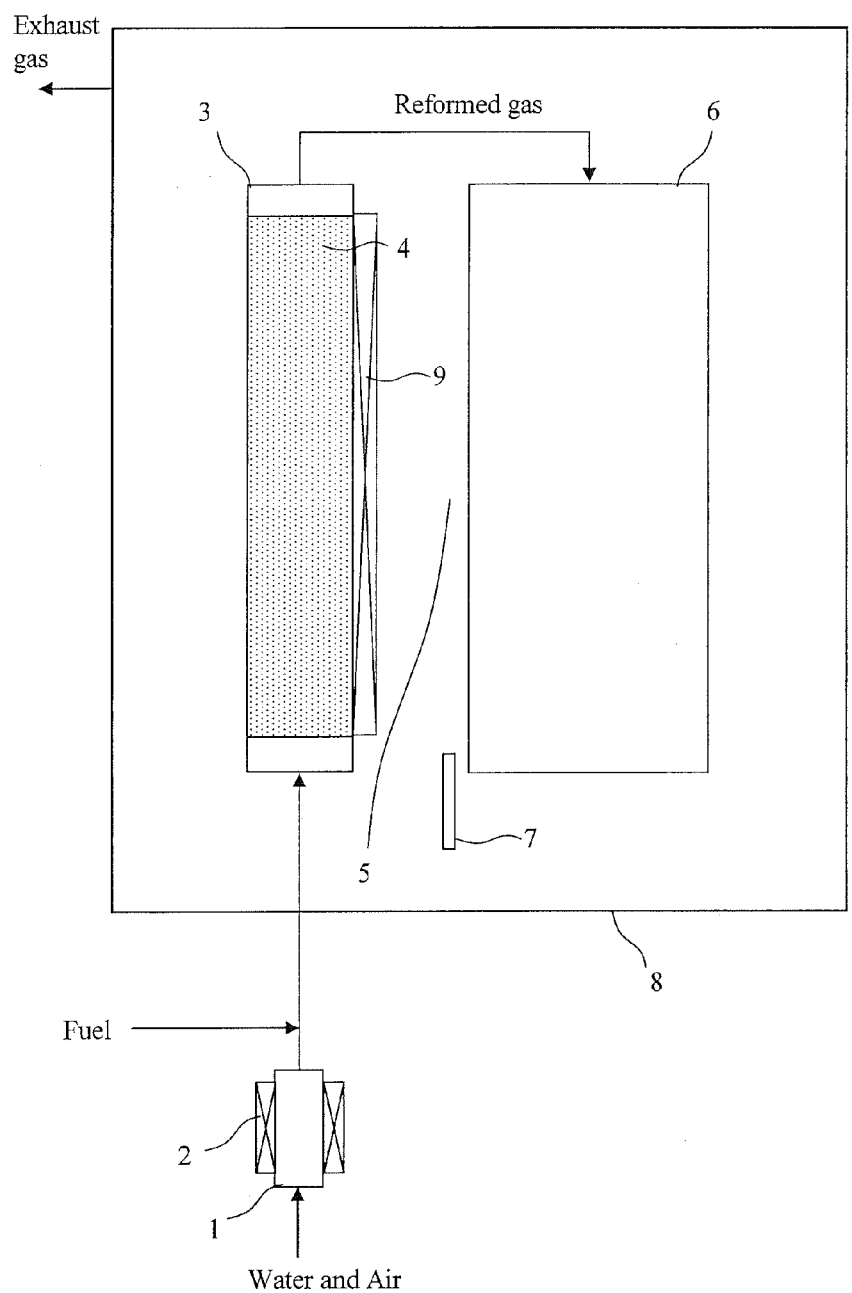
FIG. 1 is a schematic diagram showing the outline of an indirect internal reforming SOFC to which the present invention can be applied.
Figure 2:
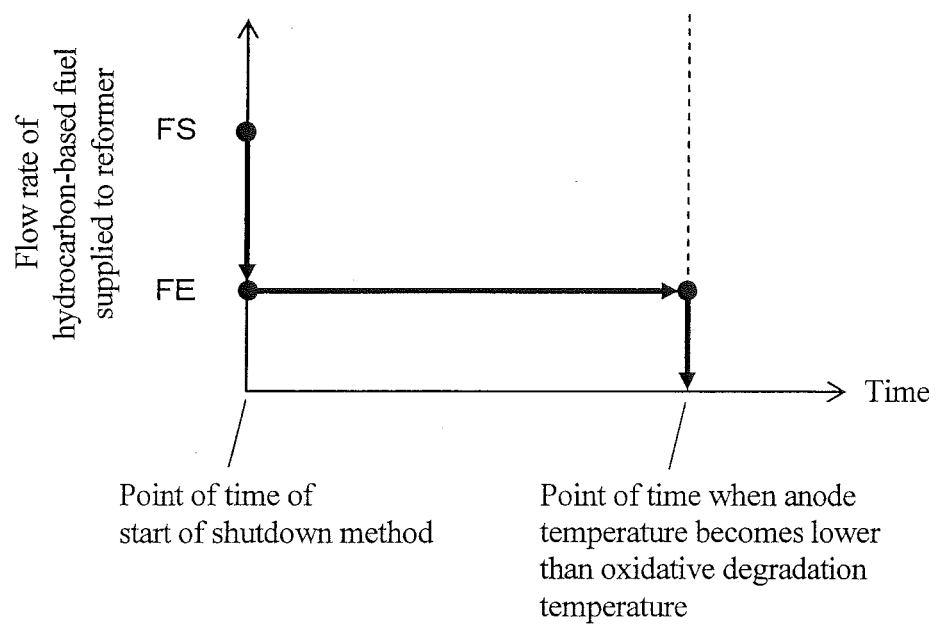
FIG. 2 is a conceptual graph showing the relationship of a hydrocarbon-based fuel flow rate to time, for explaining the method of the present invention.

DESCRIPTION OF SYMBOLS 1 water vaporizer
2 electrical heater annexed to water vaporizer
3 reformer
4 reforming catalyst layer
5 combustion region
6 SOFC
7 igniter
8 enclosure (module container)
9 electrical heater annexed to reformer
10 computer
11 flow rate control valve
12 flowmeter
13 thermocouple

BEST MODE FOR CARRYING OUT THE INVENTION

The embodiments of the present invention will be described below, using drawings, but the present invention is not limited thereto.

[Indirect Internal Reforming SOFC]

One embodiment of an indirect internal reforming SOFC that can perform the present invention is schematically shown in FIG. 1.

The indirect internal reforming SOFC includes a reformer 3 for reforming a hydrocarbon-based fuel to produce a reformed gas (hydrogen-containing gas). The reformer includes a reforming catalyst layer 4.

The indirect internal reforming SOFC includes an SOFC 6 for generating electric power using the above reformed gas, and also includes a combustion region 5 for combusting an anode off-gas discharged from the SOFC (particularly the anode of the SOFC).

The indirect internal reforming SOFC includes an enclosure 8 for housing the reformer, the solid oxide fuel cell, and the combustion region.

The indirect internal reforming SOFC refers to the enclosure (module container) 8 and equipment included in the interior of the enclosure.

In the indirect internal reforming SOFC of the embodiment shown in FIG. 1, an igniter 7 that is ignition means for igniting the anode off-gas is provided, and also, the reformer is equipped with an electrical heater 9.

Each supply gas is supplied to the reformer or the SOFC, after being appropriately preheated as required.

A water vaporizer 1 equipped with an electrical heater 2 is connected to the indirect internal reforming SOFC, and piping for supplying the hydrocarbon-based fuel to the reformer is connected to the midstream of the connection piping for the water vaporizer 1. The water vaporizer 1 generates steam by heating with the electrical heater 2. The steam may be supplied to the reforming catalyst layer after being appropriately superheated in the water vaporizer or downstream thereof.

Also, air is supplied to the reforming catalyst layer, and here, air can be supplied to the reforming catalyst layer after being preheated in the water vaporizer. Steam or a mixed gas of air and steam can be obtained from the water vaporizer.

The steam or the mixed gas of air and steam is mixed with the hydrocarbon-based fuel and supplied to the reformer 3, particularly to the reforming catalyst layer 4 of the reformer 3. When a liquid fuel, such as kerosene, is used as the hydrocarbon-based fuel, the hydrocarbon-based fuel may be supplied to the reforming catalyst layer after being appropriately vaporized.

The reformed gas obtained from the reformer is supplied to the SOFC 6, particularly to the anode of the SOFC 6. Although not shown, air is appropriately preheated and supplied to the cathode of the SOFC.

Combustible components in the anode off-gas (gas discharged from the anode) are combusted by oxygen in a cathode off-gas (a gas discharged from the cathode) at the SOFC outlet. In order to do this, ignition using the igniter 7 is possible. The outlets of both the anode and the cathode are open in the module container 8. The combustion gas is appropriately discharged from the module container.

The reformer and the SOFC are housed in one module container and modularized. The reformer is disposed at a position where it can receive heat from the SOFC. For example, when the reformer is located at a position where it receives thermal radiation from the SOFC, the reformer is heated by thermal radiation from the SOFC during electric power generation.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

The reformer 3 is heated by the combustion heat of the anode off-gas generated in the combustion region 5. Also, when the temperature of the SOFC is higher than that of the reformer, the reformer is also heated by radiation heat from the SOFC.

Further, the reformer may be heated by heat generation by reforming. When the reforming is partial oxidation reforming, or when the reforming is autothermal reforming and heat generation by a partial oxidation reforming reaction is larger than endothermic heat by a steam reforming reaction, heat is generated with the reforming.

[Reforming-Stoppable State]

In this specification, a state in which all of the following conditions i to iv are satisfied is referred to as "reforming-stoppable state".

i) The anode temperature of the SOFC is steady.

ii) The above-described anode temperature is lower than the oxidative degradation temperature.

iii) In the reformer, a reformed gas with a composition suitable to be supplied to the anode is produced.

iv) The amount of this reformed gas produced is equal to or more than the requisite minimum flow rate for preventing the oxidative degradation of the anode when the anode temperature of the SOFC is a temperature equal to or higher than the oxidative degradation temperature.

<Conditions i and ii>

The anode temperature means the temperature of the anode electrode, but may be the temperature of a stack-constituting member, such as a separator, near the anode when it is physically difficult to directly measure the temperature of the anode electrode. With respect to the location for the measurement of the anode temperature, it is preferred to use a position where the temperature becomes relatively high, more preferably a position where the temperature becomes the highest, from the viewpoint of safe control. A location where the temperature becomes high may be found by preliminary experiment or simulation.

The oxidative degradation temperature is a temperature at which the anode is oxidatively degraded. For example, the electrical conductivity of the anode material may be measured by a DC four-terminal method, with the temperature varied, in a reducing or oxidizing gas atmosphere, and the oxidative degradation temperature may be determined as the lowest temperature at which the electrical conductivity in the oxidizing gas atmosphere becomes lower than that in the reducing gas atmosphere.

<Condition iii>

The condition iii means a state in which in the reformer, the hydrocarbon-based fuel is reformed, and a reformed gas with a composition suitable to be supplied to the anode is obtained. For example, when the hydrocarbon-based fuel includes a hydrocarbon-based fuel(s) having a carbon number of two or more, the condition iii means a state in which the reformed gas is reducing and a concentration of a C2+ component(s) (one or more compounds having a carbon number of two or more) in the reformed gas is at most a concentration which does not cause any problem in view of flow blockage due to carbon deposition and anode degradation. The concentration of the C2+ component(s) in this case is preferably 50 ppb or less as a mass fraction in the reformed gas.

<Condition iv>

The requisite minimum reformed gas flow rate for preventing the oxidative degradation of the anode is the smallest flow rate among flow rates at which the anode electrode is not oxidatively degraded by the diffusion of the cathode off-gas into the interior of the anode from the anode outlet. This reformed gas flow rate may be beforehand found by performing experiment or simulation, while varying a reformed gas flow rate, in a state in which the anode temperature is maintained at the oxidative degradation temperature or higher. The oxidative degradation of the anode may be judged, for example, by measuring the electrical conductivity of the anode electrode by experiment and comparing it with that of an anode electrode not oxidatively degraded. Alternatively, the oxidative degradation of the anode may be judged by calculating the compositional partial pressure of the anode gas by simulation using an equation including an advection-diffusion term and comparing it with equilibrium partial pressure in the oxidation reaction of the anode electrode. For example, when the anode electrode material is Ni, the equilibrium partial pressure of oxygen in an anode electrode oxidation reaction represented by the following formula is $1.2 \times 10^{-14}$ atm ($1.2 \times 10^{-9}$ Pa), and when the calculated value of the oxygen partial pressure of the anode is smaller than this value, it can be judged that the anode electrode is not oxidatively degraded.

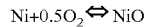

$$Ni + 0.5 O_2 \Leftrightarrow NiO$$

The flow rate of the reformed gas supplied to the SOFC (the amount of the reformed gas produced in the reformer) to prevent the oxidative degradation of the anode is preferably a flow rate such that the reformed gas is combustible at the stage of being discharged from the anode after passing through the SOFC. When the smallest flow rate among the flow rates of thus combustible reformed gas is larger than the above-described requisite minimum reformed gas flow rate, the smallest flow rate among the flow rates of the combustible reformed gas may be considered to be a reformed gas flow rate "equal to or more than the requisite minimum flow rate" referred to in the condition iv. It is possible to judge whether a gas is combustible or not, for example, by sampling a gas in the combustion gas discharge line and performing composition analysis in experiment, or by calculating in simulation.

The flow rate of the hydrocarbon-based fuel supplied to the reformer (particularly the reforming catalyst layer) in the reforming-stoppable state is represented as FE.

FE may be beforehand obtained by experiment or simulation. FE may be found by performing experiment or simulation, while varying the flow rates of fluids supplied to the indirect internal reforming SOFC, such as a flow rate of water (including steam) for steam reforming or autothermal reforming and a flow rate of air for autothermal reforming or partial oxidation reforming, which are supplied to the reformer, a cathode air flow rate, flow rates of a fuel and air supplied to a burner, and a flow rate of fluid, such as water or air, supplied to a heat exchanger; and electrical input and output to and from the indirect internal reforming SOFC, such as electrical heater output for heating the reformer, an evaporator for water or liquid fuel, the SOFC, piping for supplying fluids, and the like, and electrical input taken out from a thermoelectric conversion module and the like, in other words, varying the operation conditions of the indirect internal reforming SOFC, and searching for FE steadily satisfying the conditions i to iv. FE may be any value as long as the conditions i to iv are satisfied, but from the viewpoint of thermal efficiency, the smallest FE is preferably used. The operation conditions of the indirect internal reforming SOFC including the FE are beforehand determined as operation conditions in the reforming-stoppable state.

[Shutdown Method]

The flow rate of the hydrocarbon-based fuel supplied to the reformer at the point of time of the start of a shutdown method is represented as FS.

The shutdown method of the present invention includes the following steps a and b.

a) The flow rate of the hydrocarbon-based fuel supplied to the reformer is made to be FE from FS. Corresponding to this operation, as necessary, the flow rate of fluids supplied to the indirect internal reforming SOFC, such as the flow rate of water (including steam) for steam reforming or autothermal reforming and the flow rate of air for autothermal reforming or partial oxidation reforming, which are supplied to the reformer, the cathode air flow rate, the flow rates of the fuel and air supplied to the burner, and the flow rate of fluid, such as water or air, supplied to the heat exchanger; and electrical input and output to and from the indirect internal reforming SOFC, such as electrical heater output for heating the reformer, the evaporator for water or liquid fuel, the cell stack, the piping for supplying fluids, and the like, and electrical input taken out from the thermoelectric conversion module and the like are set in accordance with the beforehand-determined operation conditions in the reforming-stoppable state. In other words, they are set to the beforehand-determined operation conditions of the indirect internal reforming SOFC in the reforming-stoppable state.

b) The step of stopping the supply of the hydrocarbon-based fuel to the reformer when the anode temperature becomes lower than the oxidative degradation temperature.

When the indirect internal reforming SOFC is shut down, that is, at a point of time when the shutdown method is started, the step a may be immediately performed.

The feed rate of the hydrocarbon-based fuel to the reformer may remain at FE for a period after the step a is performed and until the step b is performed.

When the anode temperature becomes lower than the oxidative degradation temperature after the step a, the reducing gas becomes unneeded, and therefore, it is possible to stop the supply of the hydrocarbon-based fuel to the reformer. From the viewpoint of thermal efficiency, preferably, when the anode temperature becomes lower than the oxidative degradation temperature, the supply of the hydrocarbon-based fuel to the reformer is stopped in a time as short as possible.

In order to perform the step b, the anode temperature may be appropriately monitored (continuously measured) using a temperature sensor, such as a thermocouple.

The monitoring of the anode temperature is preferably started immediately on starting the shutdown method. In case that the temperature monitoring has been performed from before the start of the shutdown method, the temperature monitoring may be continued when the shutdown method is performed.

In the shutdown method of the present invention, any type of reforming among steam reforming, partial oxidation reforming, and autothermal reforming may be performed in the reformer.

However, the same type of reforming as a reforming type used in the reforming-stoppable state is performed when the step a is performed, and also during the period after the step a is performed and until the step b is performed. In other words, when steam reforming is used in the reforming-stoppable state, steam reforming is performed when the step a is performed, and for the period after the step a is performed and until the step b is performed.

Different types of reforming may be performed before and after the start of the shutdown method. For example, it is possible to perform steam reforming before the start of the shutdown method and perform autothermal reforming after starting the shutdown method, or vice versa. Also, it is possible to perform steam reforming before the start of the shutdown method and perform partial oxidation reforming after starting the shutdown method, or vice versa.

It is preferred to use a reforming catalyst layer that can promote a steam reforming reaction as the above-described reforming catalyst layer, and to perform steam reforming during the period after the step a is performed and until the step b is performed, that is, when the hydrocarbon-based fuel at the flow rate FE is reformed. This is because the steam reforming involves large endothermic heat, and therefore, the temperature of the reformer can be decreased faster.

When a steam reforming reaction is performed, that is, steam reforming or autothermal reforming is performed, steam is supplied to the reforming catalyst layer. When a partial oxidation reforming reaction is performed, that is, partial oxidation reforming or autothermal reforming is performed, an oxygen-containing gas is supplied to the reforming catalyst layer. As the oxygen-containing gas, a gas containing oxygen may be appropriately used, but in terms of the ease of availability, air is preferred.

The present invention is particularly advantageous when the carbon number of the hydrocarbon-based fuel is two or more, because in the case of such a fuel, particularly, reliable reforming is required.

[Another Embodiment of Indirect Internal Reforming SOFC]

Figure 3:
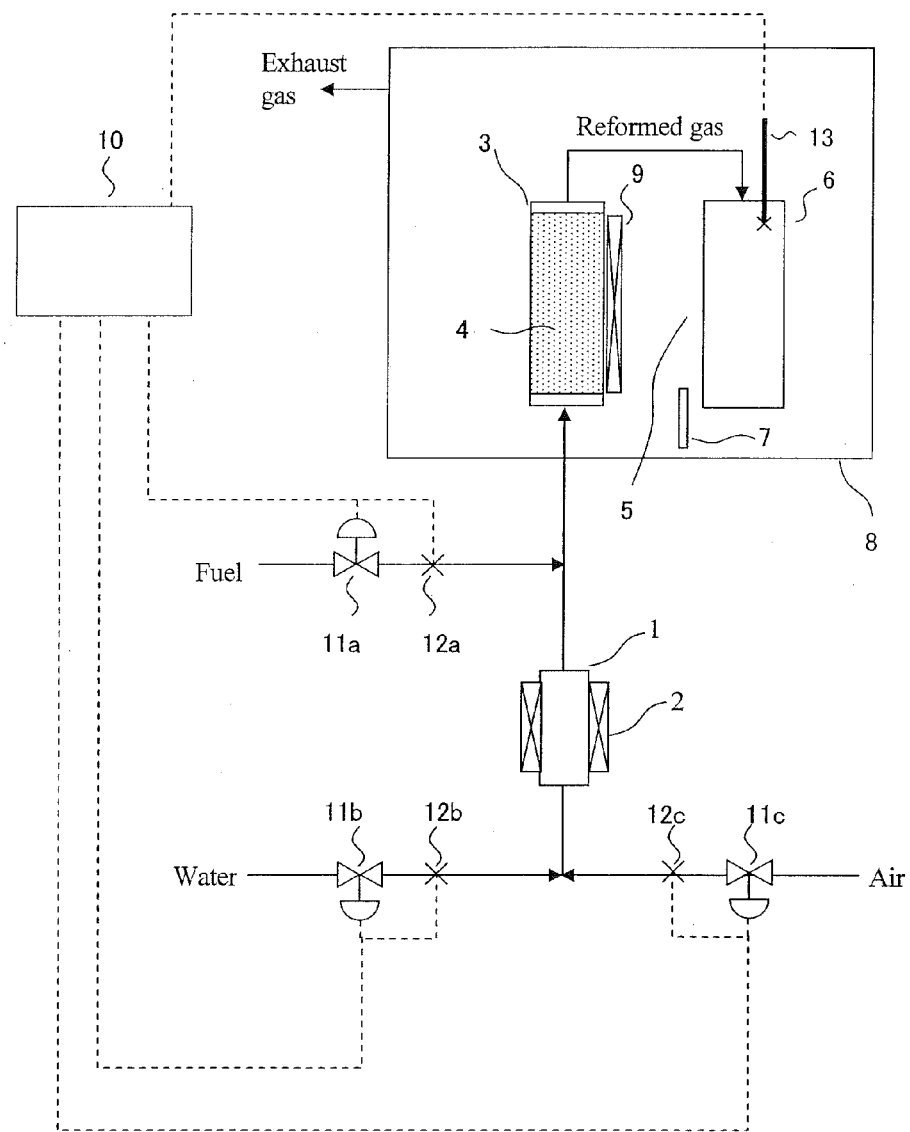
FIG. 3 is a schematic diagram showing the outline of another embodiment of the indirect internal reforming SOFC.

An embodiment of an indirect internal reforming SOFC that can be preferably used to perform the above method will be described using FIG. 3.

This indirect internal reforming SOFC includes a reformer 3 for reforming a hydrocarbon-based fuel to produce a reformed gas (this reformer includes a reforming catalyst layer 4); an SOFC 6 for generating electric power using the reformed gas; a combustion region 5 for combusting an anode off-gas discharged from the SOFC; and an enclosure 8 for housing the reformer, the solid oxide fuel cell, and the combustion region.

This indirect internal reforming SOFC further includes the following means I and II.

I) Means for causing the flow rate of the hydrocarbon-based fuel supplied to the reformer to become FE (the flow rate of the hydrocarbon-based fuel supplied to the reformer in the reforming-stoppable state) from FS (the flow rate of the hydrocarbon-based fuel supplied to the reformer at the point of time of the start of the shutdown method).

II) Means for stopping the supply of the hydrocarbon-based fuel to the reformer when the anode temperature becomes lower than the oxidative degradation temperature.

Means I may include control means in which the flow rate FE can be input and stored. As the control means, control means publicly known in the field of process control or fuel cell system control, such as a computer 10, may be used.

Also, means I may include a flow rate control valve 11a and a flowmeter 12a for the hydrocarbon-based fuel to control the flow rate of the hydrocarbon-based fuel. Also, means I may include a pump for the hydrocarbon-based fuel that can change the flow rate according to an input signal.

Means II may include a temperature sensor, such as a thermocouple 13, for sensing the anode temperature; a valve that can stop the supply of the hydrocarbon-based fuel to the reformer (which may be the flow rate control valve 11a, but a stop valve may be separately used), and a pump that can stop the supply of the hydrocarbon-based fuel in accordance with an input signal; and control means, such as the computer 10. In the control means used here, the oxidative degradation temperature can be input and stored. Also, this control means is able to receive the anode temperature from the temperature sensor, able to compare the anode temperature with the oxidative degradation temperature, able to judge that the anode temperature becomes lower than the oxidative degradation temperature, and able to issue an instruction to close the flow rate control valve 11a (or the stop valve or the like) in order to stop the supply of the hydrocarbon-based fuel to the reformer, and also an instruction to stop the operation of the pump.

The indirect internal reforming SOFC may be equipped with, for example, a flow rate control valve 11b and a flowmeter 12b for water, as required, in order to supply steam to the reforming catalyst layer. Also, the indirect internal reforming SOFC may be equipped with a pump for water that can change the flow rate according to an input signal. Also, the indirect internal reforming SOFC may be equipped with, for example, a flow rate control valve 11c and a flowmeter 12c for air, as required, in order to supply an oxygen-containing gas to the reforming catalyst layer. Also, the indirect internal reforming SOFC may be equipped with a blower for air that can change the flow rate according to an input signal.

[Hydrocarbon-Based Fuel]

It is possible to use a hydrocarbon-based fuel appropriately selected from compounds of which molecules contain carbon and hydrogen (may also contain other elements, such as oxygen) or mixtures thereof that are publicly known as raw materials of reformed gas in the field of SOFCs. It is possible to use compounds of which molecules contain carbon and hydrogen, such as hydrocarbons and alcohols. For example, hydrocarbon fuels, such as methane, ethane, propane, butane, natural gas, LPG (liquefied petroleum gas), city gas, gasoline, naphtha, kerosene and gas oil, alcohols, such as methanol and ethanol, ethers, such as dimethylether, and the like may be used.

Particularly, kerosene and LPG are preferred because they are readily available. In addition, they can be stored in a stand-alone manner, and therefore, they are useful in areas where the city gas pipeline is not built. Further, an SOFC power generating equipment using kerosene or LPG is useful as an emergency power supply. Particularly, kerosene is preferred because it is easy to handle.

[Reformer]

The reformer produces a reformed gas containing hydrogen from a hydrocarbon-based fuel.

In the reformer, any of steam reforming, partial oxidation reforming and autothermal reforming in which a steam reforming reaction is accompanied by a partial oxidation reaction may be performed.

In the reformer, a steam reforming catalyst having steam reforming activity, a partial oxidation reforming catalyst having partial oxidation reforming activity, or an autothermal reforming catalyst having both partial oxidation reforming activity and steam reforming activity may be appropriately used.

With respect to the structure of the reformer, a structure publicly known as that of a reformer may be appropriately used. For example, the structure of the reformer may be a structure having a region for housing a reforming catalyst in a sealable container, and having an introduction port for fluids required for reforming and a discharge port for a reformed gas.

The material of the reformer may be appropriately selected for use from materials publicly known as those of reformers, considering resistance in the environment used.

The shape of the reformer may be an appropriate shape, such as a rectangular parallelepiped shape or a circular tube shape.

A hydrocarbon-based fuel (vaporized beforehand as required) and steam, and further an oxygen-containing gas, such as air, as required, may be supplied to the reformer (the reforming catalyst layer), each independently, or appropriately mixed beforehand. The reformed gas is supplied to the anode of the SOFC.

[SOFC]

The reformed gas obtained from the reformer is supplied to the anode of the SOFC. On the other hand, an oxygen-containing gas, such as air, is supplied to the cathode of the SOFC. During electric power generation, the SOFC generates heat with electric power generation, and the heat is transferred from the SOFC to the reformer by radiation heat transfer and the like. In this manner, the exhaust heat of the SOFC is used to heat the reformer. Gas interfacing or the like is appropriately performed using piping and the like.

As the SOFC, a publicly known SOFC may be appropriately selected for use. In the SOFC, generally, an oxygen-ion conductive ceramic or a proton-ion conductive ceramic is used as the electrolyte.

The SOFC may be a single cell, but practically, a stack in which a plurality of single cells are arrayed (the stack is sometimes referred to as a bundle in the case of a tubular type, and the stack in this specification includes a bundle) is preferably used. In this case, one stack or a plurality of stacks may be used.

The shape of the SOFC is also not limited to a cubic stack, and an appropriate shape may be used.

The oxidative degradation of the anode may occur, for example, at about 400° C.

[Enclosure]

The enclosure (module container) may be any appropriate container capable of housing the SOFC, the reformer, and the combustion region. An appropriate material having resistance to the environment used, for example, stainless steel, may be used as the material of the container. A connection port is appropriately provided for the container for gas interfacing or the like.

The module container is preferably hermetic in order to prevent communication between the interior of the module container and the surroundings (atmosphere).

[Combustion Region]

The combustion region is a region where the anode off-gas discharged from the anode of the SOFC can be combusted. For example, the anode outlet is opened in the enclosure, and a space near the anode outlet may be the combustion region. This combustion may be performed using, for example, a cathode off-gas, as an oxygen-containing gas. In order to do this, the cathode outlet may be opened in the enclosure.

In order to combust a combustion fuel or the anode off-gas, ignition means, such as an igniter, may be appropriately used.

[Reforming Catalyst]

A publicly known catalyst may be used for each of the steam reforming catalyst, the partial oxidation reforming catalyst and the autothermal reforming catalyst used in the reformer. Examples of the partial oxidation reforming catalyst include a platinum-based catalyst. Examples of the steam reforming catalyst include ruthenium-based and nickel-based catalysts. Examples of the autothermal reforming catalyst include a rhodium-based catalyst. Examples of the reforming catalyst that can promote combustion include platinum-based and rhodium-based catalysts.

A temperature at which the partial oxidation reforming reaction can proceed is, for example, 200° C. or more. A temperature at which the steam reforming reaction can proceed is, for example, 400° C. or more.

[Operation Conditions of Reformer]

The conditions during rated operation and during shutdown operation of the reformer for each of steam reforming, autothermal reforming, and partial to oxidation reforming will be described below.

In steam reforming, steam is added to a reforming raw material, such as kerosene. The reaction temperature of the steam reforming may be in the range of, for example, 400° C. to 1000° C., preferably 500° C. to 850° C., and further preferably 550° C. to 800° C. An amount of the steam introduced into the reaction system is defined as a ratio of the number of moles of water molecules to the number of moles of carbon atoms contained in the hydrocarbon-based fuel (steam/carbon ratio). This value is preferably 1 to 10, more preferably 1.5 to 7, and further preferably 2 to 5. When the hydrocarbon-based fuel is liquid, a space velocity (LHSV) can be represented as A/B, wherein a flow velocity of the hydrocarbon-based fuel in a liquid state is represented as A (L/h), and a volume of the catalyst layer is represented as B (L). This value is set in the range of preferably 0.05 to 20 $h^{-1}$, more preferably 0.1 to 10 $h^{-1}$, and further preferably 0.2 to 5 $h^{-1}$.

In autothermal reforming, in addition to the steam, an oxygen-containing gas is added to the reforming raw material. The oxygen-containing gas may be pure oxygen, but in terms of the ease of availability, air is preferred. The oxygen-containing gas may be added so that the endothermic reaction accompanying the steam reforming reaction is balanced, and an amount of heat generation such that the temperature of the reforming catalyst layer and the SOFC can be maintained or increased is obtained. With respect to the amount of the oxygen-containing gas added, a ratio of the number of moles of oxygen molecules to the number of moles of carbon atoms contained in the hydrocarbon-based fuel (oxygen/carbon ratio) is preferably 0.005 to 1, more preferably 0.01 to 0.75, and further preferably 0.02 to 0.6. A reaction temperature of the autothermal reforming reaction is set in the range of, for example, 400° C. to 1000° C., preferably 450° C. to 850° C., and further preferably 500° C. to 800° C. When the hydrocarbon-based fuel is liquid, the space velocity (LHSV) is selected in the range of preferably 0.05 to 20 $h^{-1}$, more preferably 0.1 to 10 $h^{-1}$, and further preferably 0.2 to 5 $h^{-1}$. With respect to an amount of the steam introduced into the reaction system, the steam/carbon ratio is preferably 1 to 10, more preferably 1.5 to 7, and further preferably 2 to 5.

In partial oxidation reforming, an oxygen-containing gas is added to the reforming raw material. The oxygen-containing gas may be pure oxygen, but in terms of the ease of availability, air is preferred. An amount of the oxygen-containing gas added is appropriately determined in terms of heat loss and the like to ensure a temperature at which the reaction proceeds. With respect to this amount, the ratio of the number of moles of oxygen molecules to the number of moles of carbon atoms contained in the hydrocarbon-based fuel (oxygen/carbon ratio) is preferably 0.1 to 3 and more preferably 0.2 to 0.7. A reaction temperature of the partial oxidation reaction may be set in the range of, for example, 450° C. to 1000° C., preferably 500° C. to 850° C., and further preferably 550° C. to 800° C. When the hydrocarbon-based fuel is liquid, the space velocity (LHSV) is selected in the range of preferably 0.1 to 30 $h^{-1}$. Steam can be introduced into the reaction system to suppress the generation of soot, and with respect to an amount of the steam, the steam/carbon ratio is preferably 0.1 to 5, more preferably 0.1 to 3, and further preferably 1 to 2.

[Other Equipment]

Publicly known components of an indirect internal reforming SOFC may be appropriately provided as required. Specific examples of the publicly known components include a vaporizer for vaporizing a liquid; pressure increasing means for pressurizing various fluids, such as a pump, a compressor, and a blower; flow rate controlling means or flow path blocking/switching means for controlling the flow rate of a fluid, or blocking/switching the flow of a fluid, such as a valve; a heat exchanger for performing heat exchange and heat recovery; a condenser for condensing a gas; heating/warming means for externally heating various equipment with steam or the like; storage means of a hydrocarbon-based fuel (reforming raw material) and a combustion fuel; an air or electrical system for instrumentation; a signal system for control; a control device; and an electrical system for output and powering; a desulfurizer for reducing a sulfur concentration in a fuel; and the like.

INDUSTRIAL APPLICABILITY

The present invention can be applied to an indirect internal reforming SOFC used for, for example, a stationary or mobile power generating equipment and a cogeneration system.

The invention claimed is:

1. A method for shutting down an indirect internal reforming solid oxide fuel cell including:
   a reformer having a reforming catalyst layer, for reforming a hydrocarbon-based fuel to produce a reformed gas;
   a solid oxide fuel cell for generating electric power using the reformed gas;
   a combustion region for combusting an anode off-gas discharged from the solid oxide fuel cell; and
   an enclosure for housing the reformer, the solid oxide fuel cell and the combustion region,
   wherein the method comprises:
   a) causing a flow rate of the hydrocarbon-based fuel supplied to the reformer to become FE from FS; and
   b) stopping supply of the hydrocarbon-based fuel to the reformer when an anode temperature becomes lower than an oxidative degradation temperature,
   where FE represents a predetermined flow rate of the hydrocarbon-based fuel supplied to the reformer in a state in which the following conditions (i) to (iv) are all satisfied,
   i) the anode temperature of the solid oxide fuel cell is steady,
   ii) the anode temperature is lower than the oxidative degradation temperature,
   iii) in the reformer, the hydrocarbon-based fuel is reformed, and a reformed gas with a composition suitable to be supplied to an anode is produced, and
   iv) an amount of the reformed gas produced is equal to or more than the requisite minimum amount of the reformed gas for preventing oxidative degradation of the anode when the anode temperature of the solid oxide fuel cell is a temperature equal to or higher than the oxidative degradation temperature, and
   FS represents a flow rate of the hydrocarbon-based fuel supplied to the reformer at a point of time of start of the shutdown method.

2. The method according to claim 1, wherein the hydrocarbon-based fuel comprises a hydrocarbon-based fuel with a carbon number of two or more.

3. The method according to claim 2, wherein a concentration of compounds with a carbon number of two or more in the reformed gas is 50 ppb or less on a mass basis.

4. The method according to claim 1, wherein the flow rate FE is determined by an experiment.

5. The method according to claim 1, wherein the flow rate FE is determined by a simulation.

6. The method according to claim 1, wherein the smallest predetermined flow rate FE value is used.

7. The method according to claim 1, wherein the flow rate of the hydrocarbon-based fuel supplied to the reformer remain at FE for a period after the step (a) is performed and until step (b) is performed.

* * * * *